May 26, 1964
P. CANNON
3,134,739
METHOD FOR AND PRODUCT PRODUCED BY THE
INTRODUCTION OF ALUMINUM ATOMS INTO
THE SURFACE OF DIAMOND CRYSTALS
Filed Aug. 31, 1961
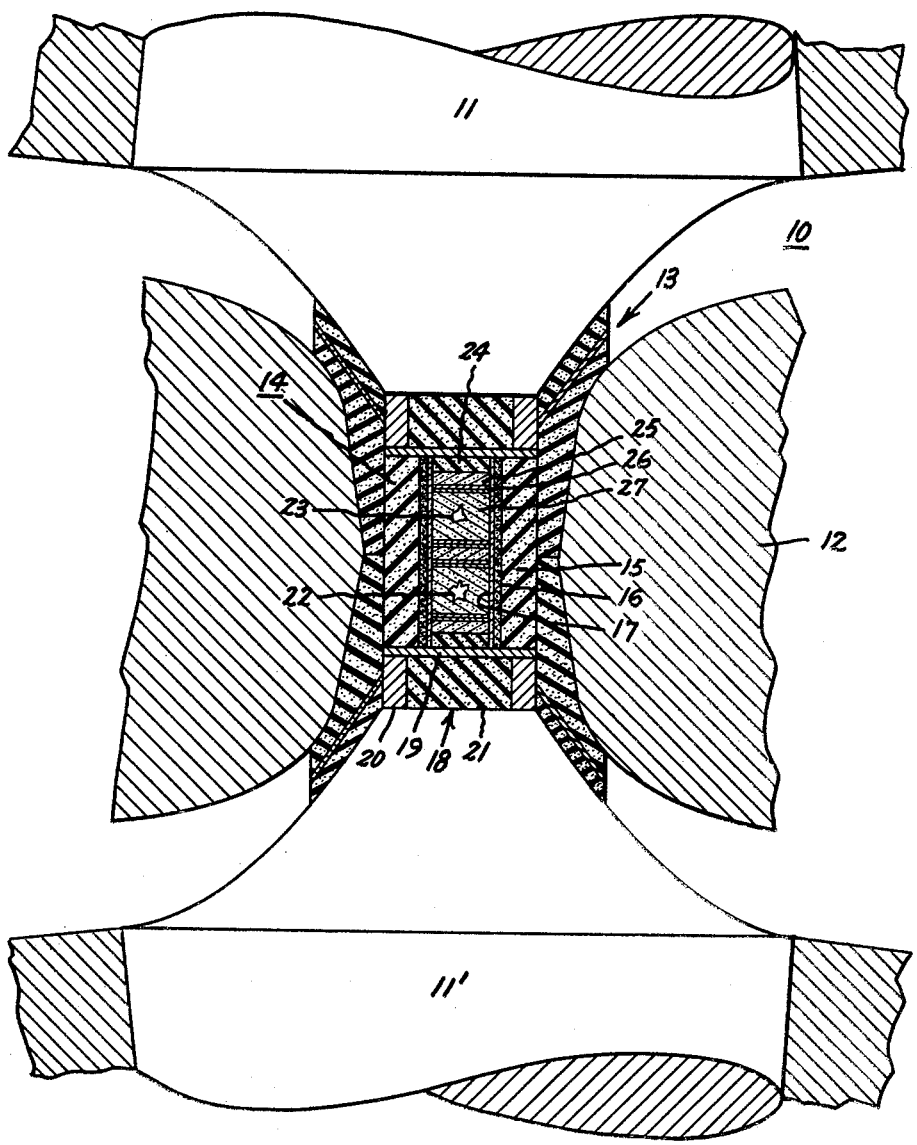
Inventor:
Peter Cannon,
by James J. Lichiello
His Attorney.

United States Patent Office 3,134,739
Patented May 26, 1964

3,134,739
METHOD FOR AND PRODUCT PRODUCED BY THE INTRODUCTION OF ALUMINUM ATOMS INTO THE SURFACE OF DIAMOND CRYSTALS
Peter Cannon, Alplaus, N.Y., assignor to General Electric Company, a corporation of New York
Filed Aug. 31, 1961, Ser. No. 135,273
4 Claims. (Cl. 252—503)

This invention relates to a method of whitening diamond and changing the electrical characteristics of diamonds. More particularly, this invention relates to an electrically conductive diamond containing aluminum introduced therein through a diffusion process.

The term "electrically conductive diamond" refers to diamond crystal by connected inclusions therein of foreign rent by means of mobile electrons or electronic defects similar to the conduction of electrical current through metals or semiconductors such as silicon. The term is intended to exclude the conduction of electricity in a diamond crystal by connected inclusions therein of foreign materials, such as metals, where conduction is through the inclusion only. "Semiconduction," however, is included in the term with respect to diamonds of this invention.

Although diamond and graphite are two allotropic forms of the same element, carbon, they are separate in having different electrical properties. While carbon is classified as electrically conductive, diamond is generally considered to be an insulator. The general resistivity of natural diamonds is about $10^{14}$ ohm-centimeters and greater. Such value is, of course, dependent on the particular measuring method and conditions. Some natural diamonds have been found which are electrically conductive, but it appears that their electrically conductive properties are generally dependent on the foreign inclusions therein and that these diamonds are conducting electricity through the inclusions alone. Natural diamonds have also been found which are electrically conductive without conducting through inclusions, and of a characteristic blue color.

Because of a diamond's high strength characteristics and its resistance to high temperatures, it is a desirable material both as an electrically conducting and semiconducting medium. A semiconducting diamond is particularly desirable because of its inherent strength, durability, and more importantly, because of the large difference in energy space between the conduction and valence bands it is relatively free from thermal effects which are injurious to the structure of and deleterious to the performance of such semiconducting materials as silicon and germanium. A semiconductive diamond crystal may then be employed, as are present semiconductors, in asymmetrical or rectifier devices, p-n junctions and the like, particularly for high temperature operations.

In copending application Serial No. 135,272, filed August 31, 1961, and assigned to same assignee as the present invention, there has been disclosed a diffusion method of providing an electrically conductive diamond. The disclosed method includes the subjection of a diamond crystal to combined elevated pressures and temperatures in the presence of an activator material such as boron, whereby atoms of boron are diffused into the diamond crystal to change its electrical conductivity. The process also may change the color of a diamond crystal to the bluer shades. Color, particularly the lighter or whiter shades, of a diamond crystal is also important not only in gem diamonds but also in commercial diamonds for different grades or mesh determinations. Previously, once a diamond crystal was mined or produced, it was extremely difficult and most impractical to change its color. Man-produced diamonds for grinding purposes are generally of a color combination of green, yellow, brown and black and thus not of a pleasing appearance nor capable of easy gradation because of color. It has been discovered that aluminum in a diamond crystal will whiten or lighten the color. The resultant additional discovery has been that these aluminum containing diamonds are also semiconductors.

Accordingly, it is an object of this invention to change the color of a diamond crystal by a diffusion process.

It is another object of this invention to whiten a diamond crystal by a diffusion process.

It is yet another object of this invention to provide an electrically conductive diamond crystal containing aluminum diffused therein.

It is a further object of this invention to diffuse aluminum into a diamond crystal through the surface thereof.

It is another object of this invention to provide a diamond semiconductor containing aluminum diffused therein.

Briefly described, this invention in one form includes subjecting diamonds to high pressures and high temperatures in the presence of an aluminum containing activator material whereby atoms of the activator material diffuse into the diamond crystal lattice to change the electrical conductivity thereof while at the same time whitening the diamond.

This invention will be better understood when taken in connection with the following description and the drawing in which the drawing is an illustration of a high pressure, high temperature apparatus which may be employed to carry out the process of this invention.

It has been discovered that diamonds may be made electrically conductive and also at the same time have their color changed to the lighter or whiter shades if a particular form of a diffusing process is applied. Contrary to the usual low pressure diffusion process, diamonds may be changed in color and electrically conductive characteristics by the diffusion of aluminum therein under conditions of high pressures and high temperatures.

The prior art contains several high pressure apparatuses which will sustain these pressures and temperatures. One apparatus is adequately disclosed and claimed in U.S. Patent 2,941,248, Hall et al. By reference, therefore, the disclosure of the above-mentioned U.S. patent is incorporated herewith.

Referring now to the drawing, there is illustrated one preferred embodiment of a high pressure, high temperature apparatus as illustrated and described in the aforementioned U.S. patent. The drawing illustrates a press apparatus 10 including a pair of punch assemblies 11 and 11' which together with a belt member 12 define a reaction zone. Gasketing 13 is positioned between the punches 11 and 11' and belt 12' to provide motion of the punches while at the same time sealing the reaction zone. A reaction vessel 14 is placed between the punches 11 and 11' in the reaction zone and includes a hollow nonconducting cylinder 15 adapted to contain an electrically conductive tube 16 and a further concentric electrically nonconductive tube 17. Tube 17 is utilized to contain the sample material. On each end of the cylinder 15 is an end cap assembly 18 which includes an electrically conductive disk member 19 and electrically conductive ring 20 encircling a plug 21 of electrically insulating material. By connecting the punches to a suitable source of power, electrical current is caused to flow through one of the punch assemblies, for example 11, through ring 20, disk 19, tube 16, as a resistance heater and in reverse order to punch 11 to provide electrical resistance heating of the sample material. A more complete description of the operation and design of this high pressure, high temperature apparatus, together with the electrical circuit involved and the calibration thereof, is found in the above-mentioned U.S. patent. Calibration of such an apparatus may vary. One preferred method of calibration is represented by a curve of pressure versus press load where the pressure is based upon the electrical transition values of certain metals such as bismuth, thallium, cesium and barium. Such a curve commences at a pressure and press load of zero (FIG. 8 of U.S. Patent 2,941,248) and proceeds through 77,000 atmospheres for the barium transition. Pressures in this application are based upon the same (77,000 atmospheres) barium transition, but at about 60,000 atmospheres and a corresponding cesium transition of about 53,500 atmospheres.

In the practice of this invention, selected natural and/or man-produced diamonds are placed in a reaction vessel 14 of FIG. 1 in tube 17 thereof, together with a suitable packing material such as graphite, and an activator material containing aluminum. The sample is then subjected to high pressures and high temperatures and aluminum atoms or ions from the aluminum-containing material diffuses into the diamond crystal to modify its electrical characteristics.

Just as specific impurities may be allowed to diffuse into germanium, silicon, etc., certain kinds of atoms may enter the diamond lattice and produce detectable effects. However, the small size of the diamond lattice ($a_0 = 3.56$ A.) compared with silicon ($a_0 = 5.42$ A.) restricts the entrance of impurities. In a perfect diamond lattice, the average interstitial cavity may receive or contain an atom or ion whose size or diameter is not much larger than a carbon atom in a diamond (i.e., about 1.55 A. in diameter). Thus in diamonds, diffusion of most atoms or ions would be expected to take place chiefly along crystal imperfections such as lines or planes of dislocations, vacancies, or pre-existing impurities. Most natural diamonds have real densities which are about 1 percent less than those expected from the unit cell size; this indicates that many vacancies may be present. It is a further discovery of this invention that an atom or ion of aluminum whose diameter is larger than the distance between centers of the carbon atoms in the diamond lattice may be diffused into the diamond crystal. The aluminum-containing activator materials which have been found to supply aluminum atoms for diffusion into diamond in this process include metallic aluminum, aluminum-containing materials, and compounds of aluminum which will decompose to provide aluminum during the diffusing process. For example, aluminum may be employed by way of compounds which include $Al_4C_3$ and $Ni_3Al_{1+x}$ where $x$ is between 0 and 2.

The particular configuration of the materials employed is of no salient importance, since it may be added in various solid configurations such as disks, tubes, plugs, cylinders, and any other geometrical or irregular shaped particles and powder, etc. In a preferred embodiment of this invention, powder is generally employed. With respect to the amount of activator material, various amounts may be employed with no marked difference in the final result. It appears that insofar as diffusion is concerned, the addition of aluminum containing material to the diamond-graphite combination generally will provide an electrically conductive diamond which is not electrically conductive through inclusions alone. By the same token, the addition of this aluminum containing material tends to lighten the color of diamond. It is, of course, understood that the amount of aluminum containing material added must be more than a trace amount or an insignificant quantity. In general, aluminum containing activator additions of about 0.1 to 30 percent (Al) by weight of diamonds provides electrically conductive diamonds in all instances and a whiter or lighter color than original. It will be readily understood that the exact amount of aluminum activator required will be determined by the aluminum content and the coefficient of distribution of the aluminum between activator and diamond at the process conditions.

The following table is representative of individual examples of the diffusion process. In all examples the diamonds employed were carefully selected for minimal inclusions, cleaned and tested for electrical conductivity or resistance. The resistivity for these diamonds before treatment was found to be greater than about $10^{15}$ ohm-centimeters at 25° C. The diamond crystals employed were also of a deep green and yellow color.

Each example included about .050 gram of man-produced diamond 22 of a resistivity of about $10^{15}$ ohm-centimeters and a natural diamond 23 of about 0.010 gram of similar resistivity. The reaction vessel 14 of the drawing was assembled with an outer graphite electrical resistance heater tube 16 and an inner $Al_2O_3$ tube 17. Tube 17 was 0.320 inch I.D. and 0.930 inch O.D., and contained alternate layers or disks of high purity aluminum and spectrographic purity graphite with a 0.075 inch $Al_2O_3$ disk at each end. The assembly from bottom up includes a 0.075 inch thick $Al_2O_3$ disk 24, a graphite disk 25 of 0.070 inch thick, a pair of Al disks 26 of 0.020 inch thickness each, a graphite disk 27 of 0.200 inch thickness with man-produced diamonds embedded therein, a pair of Al disks 26, a graphite disk 25, a pair of aluminum disks 26, a graphite disk 27 with a natural diamond embedded therein, a pair of Al disks 26, graphite disk 25 and the final $Al_2O_3$ disk 24. The particular loading sequence or configuration as illustrated is not important. Other and innumerable arrangements may be employed which in effect subject a diamond crystal and an aluminum-containing material to sufficient pressures and temperatures to acquire aluminum atom diffusion into the host diamond crystal. It is preferred, however, in the practice of this invention to use aluminum rather than aluminum compounds or other aluminum-containing materials for more effective action. Since aluminum diffusion is obtained it is obvious that the source of aluminum may be any aluminum-containing material which will provide aluminum atoms under the conditions of the examples.

The procedure for each example included loading the reaction vessel as described, placing it in the apparatus as illustrated and subjecting it to combined elevated pressures and temperatures over a period of time. Thereafter, the conditions are removed and the diamond crystals recovered, cleaned and tested.

The following table illustrates the results of each example. Measuring voltage was about 4–6 volts.

| Example | Pressure, Atmospheres | Temperature, ° C. | Time, min. | Ohms Resistance |
| --- | --- | --- | --- | --- |
| 1 | 10,000 | 700 | 20 | $10^{10}$ |
| 2 | 10,000 | 800 | 20 | $10^{11}$ |
| 3 | 10,000 | 900 | 20 | $10^{10}$ |
| 4 | 35,000 | 1,100 | 20 | $10^{7}$ |
| 5 | 60,000 | 1,500 | 20 | $10^{12}$ |
| 6 | 60,000 | 1,400 | 20 | $10^{12}$ |

It was found that pressure and temperature differences have an effect on the changes produced in diamond crystals by aluminum diffusion. Using a treatment temperature of about 800° C. maintained for about 20 minutes, crystals from an exposure made at about 10,000 atmospheres had a resistance of about $1 \times 10^{12}$ ohms (or $10^{13}$ ohm-centimeters) at 25° C. Similar crystals exposed for the same time but at about 35,000 atmospheres and 1100° C. had resistances ranging from $10^{10}$ ohms to $10^{7}$ ohms at 25° C. The effect of pressure and temperature between 10,000 atmospheres and 35,000 atmospheres and 800° C. and 1100° C. is quite noticeable. It is evident that the diamonds treated at the higher pressures showed more easily measurable conductivity. An explanation of this effect is that diamond lattice is not greatly compressed even at 35,000 atmospheres so that the diffusion rates inside the crystal are not very sensitive to external pressure. On the other hand, the fugacity difference of aluminum between the exterior and the interior of the crystal is increased at higher total pressures. Thus, higher pressures generally favor more rapid entry of the aluminum at any temperature. This is in conformance with the general Le Chatelier principle. Of course, higher operating temperatures are permitted at higher pressures because of the increased thermodynamic stability of diamond at higher pressure. This effect of pressure in the diffusion is contrary to the usual theories regarding diffusion. Evidently, different processes are involved in diffusion in diamond and graphitization of diamond. Thus, it may be possible to greatly reduce the graphitization rate of a diamond crystal while selected types of atoms are diffused into it by carrying out the diffusion operation at high pressures. It was found that the diffusion of aluminum into diamond crystals was accompanied by a change in their color, the longer and hotter the diffusion treatment, the greater the tendency for the diamonds to become white.

In the foregoing examples, all materials utilized were known materials with known impurity content. This applies not only to the graphite and activator employed, but also to materials and in effect all materials which would ordinarily be involved. Thus, for example, diamonds have been grown under similar conditions without aluminum and the diamonds recovered were neither white nor electrically conductive. Diamonds have also been subjected to high pressure, high temperature treatment in the presence of various known materials without becoming electrically conductive. These results are known for a great number of operations. Accordingly, a repeat operation with a diamond crystal and aluminum results in a generally white and electrically conductive diamond. High purity aluminum may contain very small amounts of impurities as determined by spectrographic and X-ray analysis such as, for example, Si, about 0.08%, Fe, about .27%. Many elements are present in only very small trace amounts (e.g., Ba 10 p.p.m., Be 10 p.p.m., Ca 100 p.p.m., Pb 20 p.p.m., Zr 200 p.p.m.) and not all are present in aluminum prepared by different processes. The major impurities in the high purity aluminum of 99.7%+ purity, as employed are thus Si and Fe. That the effects of Al on conductivity are not due to trace boron is established by the presence of not more than 5 p.p.m. B in the Al and not more than 8 p.p.m. B in the graphite elements of the cell. In any event, many of these elements are present in natural and man-produced diamonds which are not electrically conductive. Furthermore, many of these materials are present in surrounding and contiguous objects in a diamond growth reaction and the diamonds obtained are not electrically conductive. The evident conclusion is that in view of these results taken in connection with the p-type crystals, as hereinafter described, aluminum is the activator material.

The term "electrically conductive" is employed as intended to mean conductive other than through included impurities such as catalyst metal, etc. For example, in a cubic crystal a poor quality man-produced diamond may have metal impurities extending or interconnecting from one face to an opposite face, and when these faces are placed between electrical probes, conduction can take place through the metal inclusion alone. Conduction may also take place because of surface impurity conduction. These and other related methods of conduction have been excluded and conduction has been found to be through conduction carrier mobility of the crystal structure.

More specifically, the diamonds of each example were carefully screened for those of good clarity and form with no apparent impurities and no impurities under 30× magnification which would indicate extensive inclusions between faces. Thereafter, these diamonds were treated with a hot concentrated sulfuric acid and potassium nitrate solution to dissolve any surface impurities and to leach out any inclusions having a surface contact. Aqua regia was also employed in the cleaning process. Extensive washing with hot distilled water was employed until no microscopic residue was observed in a vessel in which the wash water was evaporated.

The processed diamonds were then placed between conductors of a volt-ohm-milliampere meter for resistivity measurement. Several measurements were made to include different faces of each crystal and usually only minor changes in resistivity were noted for the same crystal.

Several semiconductive tests were performed on the selected and cleaned diamond crystals as follows. A single crystal was placed within a small diameter Pyrex tube and a silver wire probe inserted in each end of the tube adjacent the crystal. The silver probes were connected to a volt-ohm-milliampere meter so that the resistance of the crystal could be measured. The tube apparatus was heated to about 250° C. After temperature stabilization, the resistance of the crystal was measured. In all instances, electrical resistance decreased with a rise in temperature indicating that the conductivity was true semiconduction and not conduction by metallic or graphitic inclusions. The activation energy for conduction was found to be about 0.1–0.2 electron volt.

The crystal lattice of diamond is generally referred to as the "diamond cubic form" which is the same structure taken by silicon and germanium. The basic bond pattern is a tetrahedral bond wherein each atom has four nearest neighbors bound to it by valence binding forces. The diamond cubic lattice is an example of an open as distinguished from a closed packed structure. The distance between the centers of nearest neighboring atoms of a diamond cubic crystal is 1.54 angstroms. It is assumed, therefore, that since, for example, an Al atom or ion is not grossly larger than this dimension, that the diamond crystal lattice accepts an Al atom or ion. The Al atom then becomes an impurity or foreign atom in the crystal lattice in the same manner as foreign atoms are included in semiconductors. Impurities may be interstitial or substitutional. In the first instance, the atoms are located between the normal lattice positions for the host crystal atoms, while in the second, they replace host crystal atoms and occupy normal lattice positions. The Al atom, for example, with three electrons, competes with surrounding carbon atoms to have a fourth electron so that a total of 8 (as a well-known filled shell) electrons may be located around the Al. The competition in the four bond positions thus results in a hole in the valence band of the host and thus produces a p-type crystal with a conduction activation energy much less than that of the prior host.

It is noted that diamonds doped with Al by this process range from very light color shades to colorless. It is also noted that when various other materials are added to the diffusion process, diamonds usually exhibit definite colors. It is, therefore, believed that aluminum atoms entering the carbon lattice enter therein as atoms within the crystal framework rather than simple inclusions and that, therefore, the diamond is conductive by virtue of modifications in the host through the crystal electron band structure rather than through added metallic inclusions. By the same token, the characteristic light color is obtained through a change in the electronic band structure of the host.

The process is applicable to the production of whiter or colorless diamonds where such diamonds are desired, and thus the invention becomes also a process for changing the color of diamonds. It has been described that, ordinarily, diamonds grown with the described catalysts may vary in colors of brown, green, yellow, white and black and various shades thereof depending on temperatures and pressures employed. At high pressures and temperatures, diamonds grown become more clear or white, but aluminum diffusion provides a more marked and contrasting change to colors. It may also be desirable to diffuse impurities into only selected portions of a crystal in accordance with the teachings of this invention.

While other modifications of this invention and variations that may be employed within the scope of the invention have not been described, the invention is intended to include all such as may be embraced within the following claims.

What I claim as new and desire to secure by Letters Patent of the United States is:

1. A method for diffusing aluminum atoms into a diamond crystal comprising the steps of:
   (a) subjecting a diamond crystal to a pressure of at least 10,000 atmospheres and a temperature of at least 700° C. in the presence of an activator material,
      (1) said activator material being a substance from which under the operating pressure and temperature aluminum atoms are removed from said substance and are ultimately diffused into the lattice of said diamond crystal,
      (2) said activator material being present in an amount by weight in the range from about 0.1 percent to about 30 percent of the weight of diamond, and
   (b) recovering the aluminum-impregnated crystal.

2. A method for diffusing aluminum atoms into a diamond crystal comprising the steps of:
   (a) subjecting a diamond crystal to a pressure of at least 10,000 atmospheres and a temperature of at least 700° C. in a reaction chamber in the presence of an activator material,
      (1) said activator material consisting of at least one substance chosen from the class consisting of Al, $Al_4C_3$, and $Ni_3Al_{1+x}$ where $x$ is between 0 and 2,
      (2) said activator material being present in an amount by weight in the range of from about 0.1 percent to about 30 percent of the weight of diamond, and
   (b) recovering said diamond crystal containing surface diffused aluminum atoms from said reaction chamber.

3. The method substantially as recited in claim 2 wherein the activator material is aluminum.

4. A diamond crystal containing aluminum atoms diffused into the surface thereof, said diamond crystal being produced by the process steps comprising:
   (a) subjecting a diamond to a pressure of at least 10,000 atmospheres and a temperature of at least 700° C. in the presence of an activator material,
      (1) said activator material being a substance from which under the operating pressure and temperature aluminum atoms are removed from said substance and are ultimately diffused into the lattice of said diamond crystal,
      (2) said atmospheric material being present in an amount by weight in the range of from about 0.1 percent to about 30 percent of the weight of diamond, and
   (b) recovering said diamond crystal with aluminum atoms diffused into the surface thereof.

References Cited in the file of this patent
UNITED STATES PATENTS
2,947,609     Strong ----------------- Aug. 2, 1960